US010871309B2

(12) United States Patent
Pena Sagastuy et al.

(10) Patent No.: US 10,871,309 B2
(45) Date of Patent: Dec. 22, 2020

(54) AZIMUTHAL AND ELEVATION ROTATION MECHANISM FOR A SOLAR TRACKER

(71) Applicant: SENER, INGENIERIA Y SISTEMAS, S.A., Getxo (ES)

(72) Inventors: Jorge Pena Sagastuy, Getxo (ES); Koldo Muguruza Arribas, Getxo (ES); Anton Kaifer Martinez, Getxo (ES); Miguel De La Torre Sierra, Getxo (ES)

(73) Assignee: SENER, INGENIERIA Y SISTEMAS, S.A., Getxo (ES)

( * ) Notice: Subject to any disclaimer, the term of this patent is extended or adjusted under 35 U.S.C. 154(b) by 0 days.

(21) Appl. No.: 16/165,688

(22) Filed: Oct. 19, 2018

(65) Prior Publication Data

US 2019/0120526 A1 Apr. 25, 2019

(30) Foreign Application Priority Data

Oct. 20, 2017 (ES) .................................. 201731238

(51) Int. Cl.
*F24S 30/45* (2018.01)
*F24S 30/452* (2018.01)
*F24S 30/00* (2018.01)

(52) U.S. Cl.
CPC ............. *F24S 30/45* (2018.05); *F24S 30/452* (2018.05); *F24S 2030/115* (2018.05); *F24S 2030/15* (2018.05); *F24S 2030/16* (2018.05); *Y02E 10/47* (2013.01)

(58) Field of Classification Search
CPC . Y02E 10/47; F24S 50/20; F24S 30/45; F24S 30/452; F24S 2030/115; F24S 2030/11
USPC ......................... 126/569, 576–577, 600–603
See application file for complete search history.

(56) References Cited

U.S. PATENT DOCUMENTS 6,123,067 A 9/2000 Warrick
2014/0013879 A1 1/2014 Enrile Medina et al.

FOREIGN PATENT DOCUMENTS

| DE | 102012021106 A1 | 8/2013 |
| ES | 473356 A1 | 9/1978 |
| ES | 2436852 A1 | 1/2014 |
| ES | 2495590 B1 | 9/2014 |
| WO | 2013178850 A1 | 12/2013 |

OTHER PUBLICATIONS

Spanish Search Report dated Feb. 28, 2018 for Spanish Application No. 201731238.

*Primary Examiner* — Vivek K Shirsat
(74) *Attorney, Agent, or Firm* — Lucas & Mercanti, LLP

(57) ABSTRACT

Azimuthal and elevation rotation mechanism for solar trackers, which provides an azimuthal rotation around a vertical pedestal to an azimuthal rotating support on which a support structure of solar panels is in turn mounted with elevation rotation capacity around a horizontal shaft linked to the azimuthal rotating support. The azimuthal rotation is obtained by means of a single azimuthal linear actuator and the elevation rotation is obtained by means of a single elevation linear actuator, such that only two linear actuators are needed to obtain all the positions of the solar panels required for a complete solar tracking.

15 Claims, 12 Drawing Sheets

US 10,871,309 B2

AZIMUTHAL AND ELEVATION ROTATION MECHANISM FOR A SOLAR TRACKER

CROSS REFERENCE TO RELATED APPLICATION

This application claims priority of Spanish Application No. P 201731238 filed Oct. 20, 2017, application which is incorporated herein by reference.

FIELD OF THE INVENTION

The present invention pertains to the technical field of solar trackers, and more specifically to T-shaped solar trackers constituted by a vertical pedestal on which an azimuthal rotating support with the capacity to rotate around the pedestal is mounted, on which a supporting structure of solar panels is in turn mounted, which has elevation rotation capacity around a horizontal shaft linked to the azimuthal rotating support. The azimuthal rotation and elevation rotation are achieved by linear actuators, and the solar panels can be photovoltaic solar panels or heliostat mirrors. The invention relates in particular to an azimuthal and elevation rotation mechanism for a solar tracker, with a single azimuthal linear actuator that provides the azimuthal rotation, and a single elevation linear actuator that provides the elevation rotation, such that, by means of only two linear actuators, it is possible to obtain all the positions of the supporting structure of solar panels required to conduct a complete solar tracking.

BACKGROUND OF THE INVENTION

Solar trackers use mechanisms to position the supporting structure of solar panels in the appropriate orientation to capture the energy of the sun. This orientation depends on the geographical location of the tracker, the timing (day of the year and time of day) and the solar technology in question (solar thermal or photovoltaic).

To provide this orientation to the supporting structure of solar panels, the mechanism needs to be actuated according to two degrees of freedom, which in most of the mechanisms for solar trackers are azimuth and elevation.

Currently, there are numerous mechanisms for solar trackers which offer azimuth and elevation actuation, and can be classified depending on actuator type (rotary or linear), actuation type (electromechanical or electro-hydraulic), the angular travel they offer, their load capacity both in terms of retention and actuation, and on their precision in tracking the sun. The clear objective of all of them is to reduce their manufacturing, assembly and maintenance costs for certain features.

U.S. Pat. No. 6,123,067, WO2013/178850 and ES2495590B1 disclose mechanisms for solar trackers based on azimuth and elevation actuation by means of hydraulic linear actuators.

The mechanism described in U.S. Pat. No. 6,123,067 comprises a rotating frame that rotates around the pedestal of the tracker, actuated by two hydraulic cylinders for azimuthal movement that provide 360° of azimuthal movement. The mechanism has a third hydraulic cylinder that actuates the elevation movement in a range of approximately 90°, such that it can position the supporting structure of solar panels in any elevation position comprised between 0° (horizontal position) and 90° (vertical position).

Document WO2013/178850A1 discloses an azimuthal hydraulic actuation mechanism materialized by means of two linear cylinders attached to the same common shaft, but at a different height so that they do not cross, allowing a complete 360° rotation of the supporting structure of solar panels with respect to the support pedestal. In addition, the mechanism is completed with a third linear actuator to perform the elevation movement in a range of approximately 90°, as in the previous mechanism.

Document ES2495590B1 discloses an azimuthal hydraulic actuation mechanism materialized by means of at least three hydraulic cylinders located on the same horizontal plane, which are attached to the same common shaft allowing a complete 360° rotation of the supporting structure of solar panels with respect to the support pedestal. In addition, the mechanism has an additional hydraulic cylinder to perform the elevation movement in a range of approximately 90°, as in the previous mechanisms.

All of these mechanisms have an elevation rotation range of approximately 90° and are able to position the supporting structure of solar panels according to the different orientations required at all times throughout the year thanks to the fact that its azimuthal actuation allows a rotation of approximately 360° with respect to the pedestal.

Now, this need of rotation of approximately 360° in the azimuth shaft, which must be accompanied by the capacity to apply or retain the necessary loads to maintain the desired orientation at all times and the rigidity required to ensure precision in any of the orientations, makes it necessary to use at least two linear actuators to actuate the azimuth shaft, which makes the mechanism more expensive.

On the other hand, the use of these two or more actuators to actuate the same degree of freedom causes the mechanism to be over-actuated on the azimuth, which makes the mechanism more complex to control to the extent the commands of the different actuators must be well coordinated on the azimuth to avoid undesirable internal efforts and a complex assembly, since all the actuators must have the pistons in the correct position to be mounted on the common shaft.

It is therefore desirable to have a mechanism for a solar tracker which, being capable of providing the desired orientation of the supporting structure of solar panels at all times and having the capacity to apply or retain the necessary loads and rigidity to ensure precision, needs less actuators, can be controlled more easily, is easier to assemble and requires less maintenance, all of which will lead to a reduction in costs.

DESCRIPTION OF THE INVENTION

The present invention solves the problems existing in the state of the art by means of an azimuthal and elevation rotation mechanism for a solar tracker as described in claim 1.

The azimuthal and elevation rotation mechanism for a solar tracker is configured to support a supporting structure of solar panels and provide an azimuthal rotation of the supporting structure around a fixed vertical shaft arranged on the vertical pedestal of the solar tracker by means of azimuthal rotation means, and further to provide the elevation rotation of the supporting structure in a range greater than 90°, which allows the supporting structure of solar panels to be tilted both forward (according to FIG. 1b) and backward (according to FIG. 1c) around a movable horizontal elevation shaft by means of elevation rotation means.

The supporting structure of solar panels tilts forward when the solar tracker is in intermediate positions between the positions of FIGS. 1a and 1b, while the supporting structure of solar panels tilts backward when the solar tracker is in intermediate positions between the positions of FIGS. 1a and 1c.

The azimuthal rotation means are constituted by a fixed part that is rigidly attached to the vertical pedestal, and by an azimuthal rotating support attached to the fixed part by means of a rotating element.

The azimuthal rotating support is configured to rotate around the shaft of the pedestal. In addition, the movable horizontal elevation shaft, around which the elevation rotation of the supporting structure takes place, is arranged on said azimuthal rotating support.

The fixed part can be integral to the vertical pedestal of the solar tracker, or it can be an independent part. As for the rotating element, it is preferably formed by a slewing bearing formed in turn by an inner ring and an outer ring.

Furthermore, the azimuthal rotation means have a single horizontal azimuthal linear actuator, which is preferably a hydraulic cylinder, which sleeve is articulated by means of a first vertical joint to the azimuthal rotating support, and which piston is attached by means of a second vertical joint around which a first articulated assembly can rotate. This first articulated assembly in turn comprises a first articulated rod, which is attached to the fixed part by means of a third fixed vertical joint, and a second articulated rod, which is attached to the first articulated rod by means of a vertical joint and to the azimuthal rotating support by means of a fourth vertical joint. These azimuthal rotation means constituted by a single linear actuator and the articulated assembly provide a rotation around the vertical shaft of approximately 180°.

According to different embodiments of the invention, the azimuthal linear actuator and the first and second articulated rods can be arranged on the same plane, or on different planes.

According to a particular embodiment of the invention, the azimuthal linear actuator is attached to the first articulated rod and to the second articulated rod of the first articulated assembly directly by means of the vertical joint. Alternatively, the azimuthal linear actuator is attached to the first articulated rod or to the second articulated rod of the first articulated assembly by means of the vertical joint, the two articulated rods being attached to each other by means of an additional fifth vertical joint different from the second, third and fourth vertical joints. This would make it possible to simplify the attachment between the two rods and the linear actuator by adapting it to different mechanism sizes and/or simpler manufacturing processes.

The elevation rotation means have an elevation linear actuator, which is preferably a hydraulic cylinder and is perpendicular to the movable horizontal elevation shaft, and according to the preferred embodiment of this invention, is articulated to the azimuthal rotating support and the supporting structure of solar panels by means of corresponding joints parallel to the elevation shaft. These elevation rotation means provide a rotation range of more than 90°, that is, they can also tilt the supporting surface of solar panels backward. Therefore, these elevation rotation means allow the supporting structure of solar panels to rotate by positioning it with a forward and backward tilt. This rotation of more than 90° is obtained with the appropriate configuration and length of the elevation linear actuator.

According to another particular embodiment of the invention, alternative to the one described above, this elevation linear actuator is articulated by means of a first horizontal joint to the azimuthal rotating support and the piston of said elevation linear actuator is attached by means of a second horizontal joint around which a second articulated assembly can rotate. This second articulated assembly in turn comprises a third articulated rod, which is attached to the supporting structure by means of a third horizontal joint, and a fourth articulated rod, which is attached to the third articulated rod by means of a horizontal joint and to the azimuthal rotating support by means of a fourth horizontal joint.

According to different embodiments of the invention, the elevation linear actuator and the third and fourth articulated rods can be arranged on the same plane, or on different planes.

According to a particular embodiment of the invention, the elevation linear actuator is attached to the third articulated rod and to the fourth articulated rod of the second articulated assembly directly by means of the horizontal joint, which attaches the rods to each other. Alternatively, the elevation linear actuator is attached to the third articulated rod or to the fourth articulated rod of the second articulated assembly by means of the horizontal joint, the two articulated rods being attached to each other by means of an additional fifth horizontal joint different from the second, third and fourth horizontal joints.

Therefore, according to the invention, the mechanism comprises only two linear actuators, which can be hydraulic or electromechanical, one of which is responsible for performing the azimuthal movement and the other for performing the elevation movement. The main advantage of the present invention is that it avoids the need to use at least two linear actuators for azimuthal movement since the necessary range of azimuthal movement is reduced to values of around 180° thanks to the fact that the mechanism has an elevation movement range greater than 90°, that is, it has the capacity to tilt the supporting structure of solar panels forward and backward. This is possible because, for example, the result of a 180° azimuthal rotation and a subsequent 30° forward elevation rotation is equivalent to a 30° backward elevation rotation, as can be verified by taking into account the forward and backward positions of FIG. 1.

The elevation movement range can be adjusted depending on the needs, the geographic coordinates of the location of the tracker, the size of the solar plant where the solar tracker will be installed, etc. The most usual elevation movement will be between a forward tilt of about 90° with respect to the horizontal position and a backward tilt of about 45° with respect to the horizontal position.

Other advantages derived from using a single actuator in the azimuthal rotation movement are that, as it is not an over-actuated actuator, it is easier to control and assemble than existing mechanisms.

In addition, the use of only one actuator for each degree of freedom simplifies the mechanism and reduces the maintenance needs thereof.

All the above advantages translate into lower manufacturing, assembly and maintenance costs for the mechanism.

BRIEF DESCRIPTION OF THE DRAWINGS

Next, to facilitate the understanding of the invention, an embodiment of the invention referring to a series of figures will be described by way of illustration but not limitation.

FIG. 1 schematically shows a solar tracker including an azimuthal and elevation rotation mechanism object of the present invention in different positions.

Figure 1C:
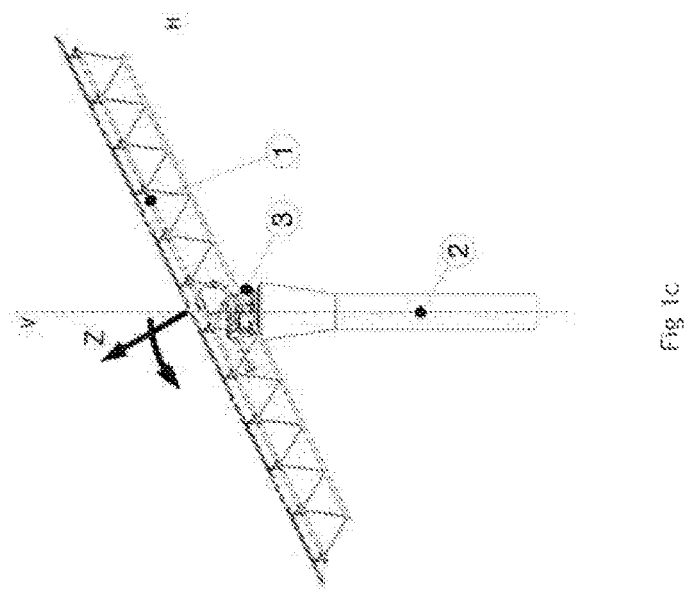
FIG. 1c shows a position 3 wherein the tracker is in a position with a backward tilt, namely −30°.

In these figures reference is made to the following set of elements:
1. supporting structure of solar panels
2. pedestal of the solar tracker
3. azimuthal and elevation rotation mechanism
4. azimuthal linear actuator
5. elevation linear actuator
6. azimuthal rotating support
7. supports of the linear actuators
8. first vertical joint attaching the azimuthal linear actuator to the azimuthal rotating support
9. first articulated rod of the azimuthal rotation means
10. second articulated rod of the azimuthal rotation means
11. second vertical joint of the azimuthal rotation means
12. third fixed vertical joint attaching the first rod to the fixed part
13. rotating element
14. fixed part of the azimuthal rotation means
15. fourth vertical joint of the azimuthal rotation means
16. first vertical joint attaching the elevation linear actuator to the azimuthal rotating support
17. movable horizontal elevation shaft arranged on the azimuthal rotating support
18. second horizontal joint of the elevation linear actuator
19. inner ring of the rotating element
20. outer ring of the rotating element
21. fifth vertical joint of the azimuthal rotation means
22. fourth articulated rod of the elevation rotation means
23. fifth horizontal joint of the elevation rotation means
24. third articulated rod of the elevation rotation means
25. third horizontal joint of the elevation rotation means
26. fourth horizontal joint of the elevation rotation means

DETAILED DESCRIPTION OF THE INVENTION

The object of the present invention is an azimuthal and elevation rotation mechanism for a solar tracker.

Figure 1B:
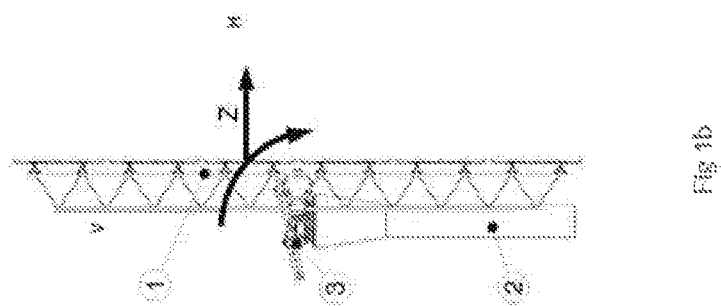
FIG. 1b shows a position 2 wherein the tracker is in the position of greatest forward tilt, namely 90°, or vertical position.
Figure 1A:
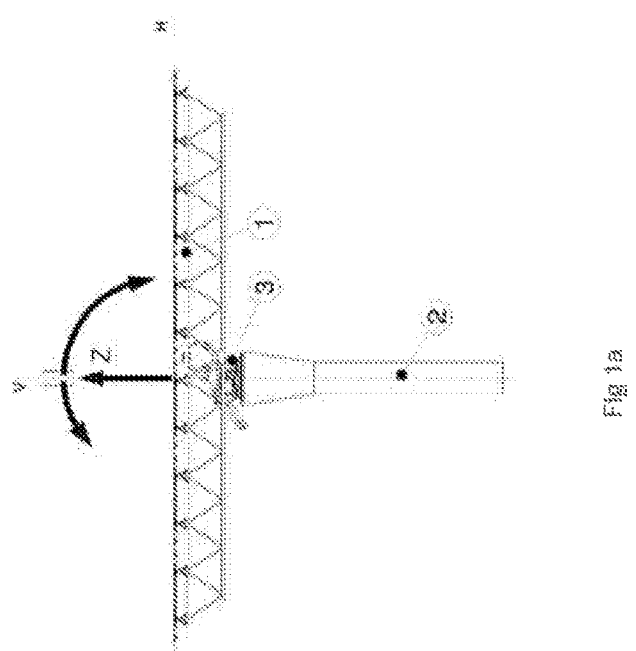
FIG. 1a shows a position 1 wherein the tracker is in a horizontal position.
Figure 2:
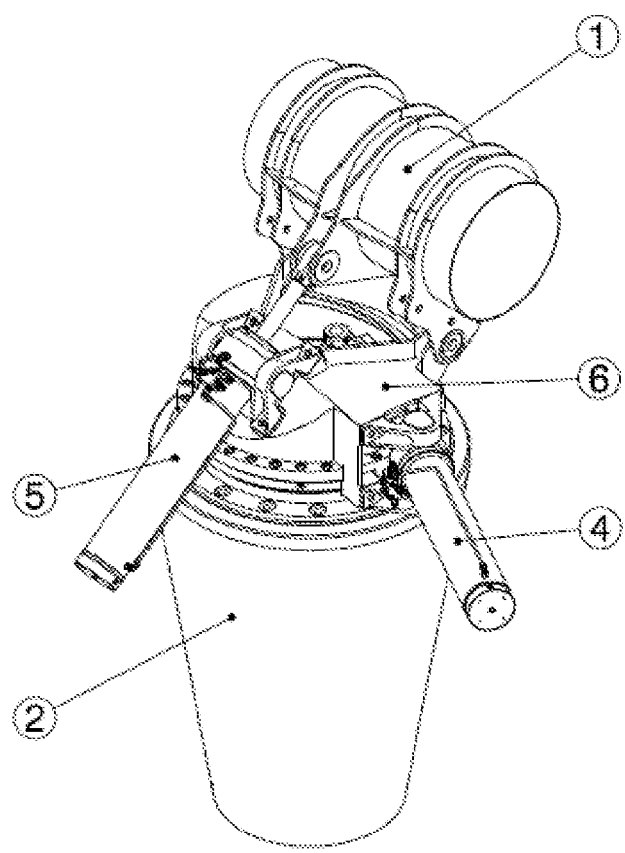
FIG. 2 shows a perspective view of an embodiment of an azimuthal and elevation rotation mechanism for a solar tracker object of the present invention.
Figure 3:
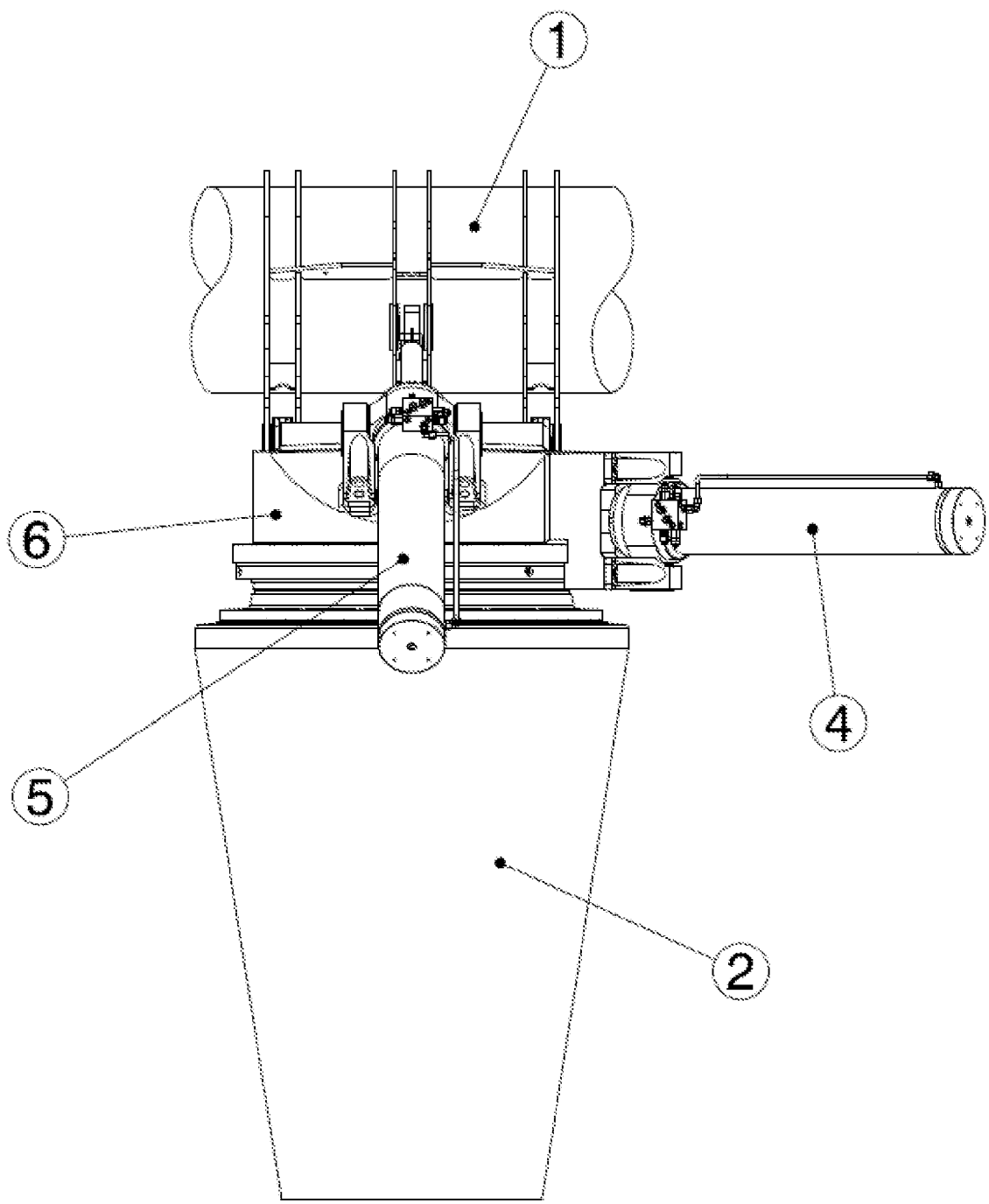
FIGS. 3 and 4 show a front and side view, respectively, of the mechanism of FIG. 2.
Figure 4:
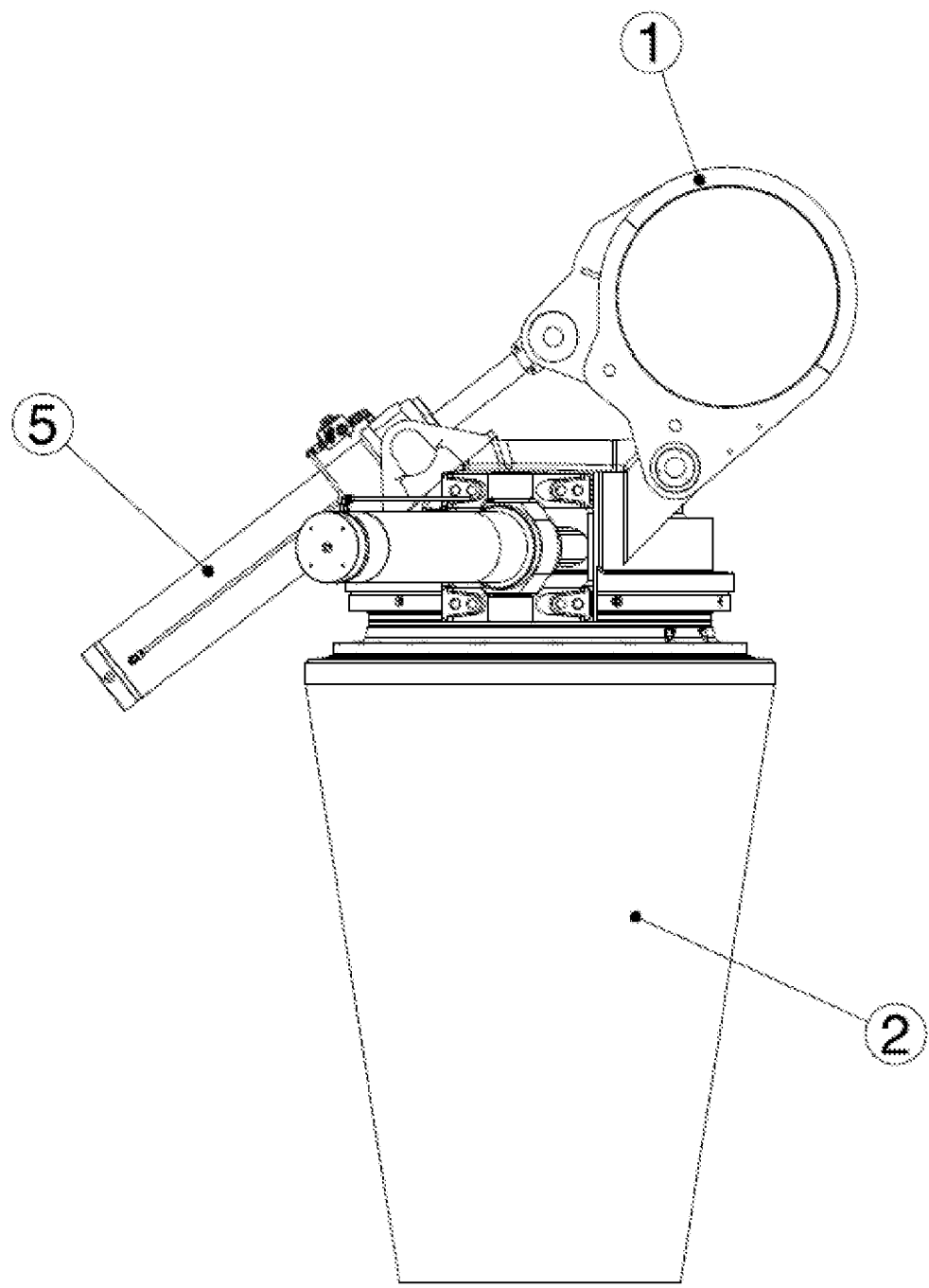

As shown in the figures, the rotation mechanism 3 for a solar tracker is configured to support a supporting structure 1 of solar panels and provide said supporting structure 1 with an azimuthal rotation around a fixed vertical shaft arranged on the vertical pedestal 2 of the solar tracker by means of azimuthal rotation means, and elevation rotation in both directions (i.e., "forward" and "backward") around a movable horizontal elevation shaft 17 by means of elevation rotation means. FIG. 1 shows the different positions of the solar tracker allowed by the azimuthal and elevation rotation mechanism object of the present invention.

The azimuthal rotation means are constituted by a fixed part 14 that is rigidly attached to the pedestal 2, and by an azimuthal rotating support 6 attached to the fixed part 14 by means of a rotating element 13.

The azimuthal rotating support 6 is particularly constituted by a cylindrical wall casing, in which an opening is provided for the passage of the azimuthal linear actuator 4, and is configured to rotate around the shaft of the pedestal 2. In addition, the movable horizontal elevation shaft 17, around which the elevation rotation of the supporting structure 1 takes place, is arranged on said azimuthal rotating support 6.

Figure 5:
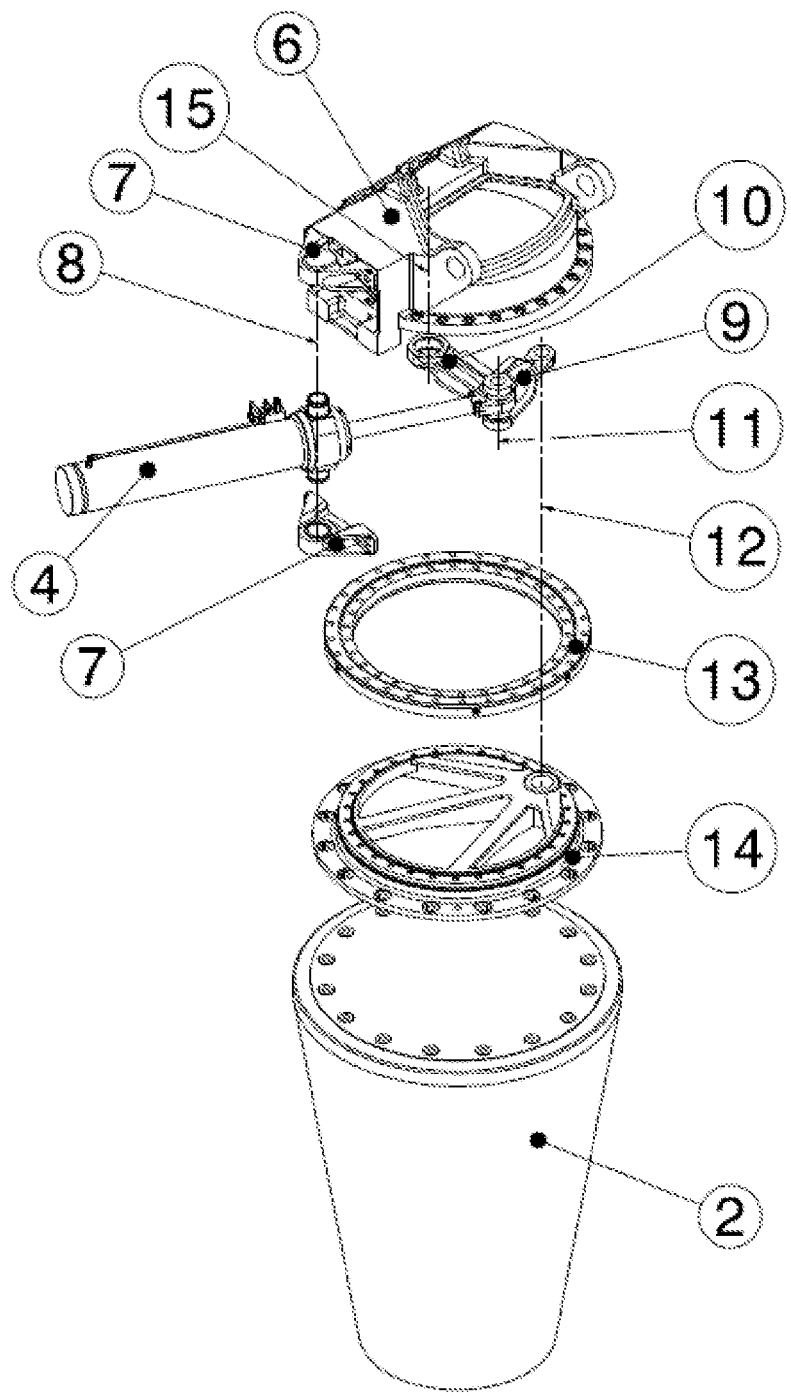
FIG. 5 is an exploded perspective view of the essential components of an embodiment of the azimuthal rotation means of the mechanism.

The fixed part 14 can be integral to the vertical pedestal 2 of the solar tracker, or it can be an independent part, as shown in FIG. 5.

As for the rotating element 13, it is preferably formed in a slewing bearing comprising in turn an inner ring 19 and an outer ring 20, as shown in FIG. 5 and FIGS. 7 to 10. According to a particular embodiment of the invention, the inner ring 19 of the slewing bearing is affixed to the fixed part 14, while the outer ring 20 is affixed to the azimuthal rotating support 6. According to an alternative embodiment of the invention, the inner ring 19 of the slewing bearing is affixed to the azimuthal rotating support 6, while the outer ring 20 is affixed to the fixed part 14. As an alternative to the slewing bearing, any other known rotary support system could be used.

Furthermore, the azimuthal rotation means have a single horizontal azimuthal linear actuator 4, which is preferably a hydraulic cylinder, which is articulated by means of a first vertical joint 8 to the azimuthal rotating support 6. Supports 7 of the linear actuators rigidly attached to the azimuthal rotating support 6 are used to facilitate the assembly of this first vertical joint 8, as shown in FIG. 5.

The piston of the azimuthal linear actuator 4 is attached by means of a second vertical joint 11 around which a first articulated assembly can rotate. This first articulated assembly in turn comprises a first articulated rod 9, which is attached to the fixed part 14 by means of a third fixed vertical joint 12, and a second articulated rod 10, which is attached to the first articulated rod 9 by means of a vertical joint, and to the azimuthal rotating support 6 by means of a fourth vertical joint 15. This configuration of the azimuthal rotation means can be observed in detail in FIG. 5 and FIGS. 7 to 10.

According to a preferred embodiment of the invention, the azimuthal linear actuator 4, the first articulated rod 9 and the second articulated rod 10 are arranged on the same plane, as shown in FIG. 5. Alternatively, the azimuthal linear actuator 4, the first articulated rod 9 and the second articulated rod 10 are arranged on different planes.

Figure 11:
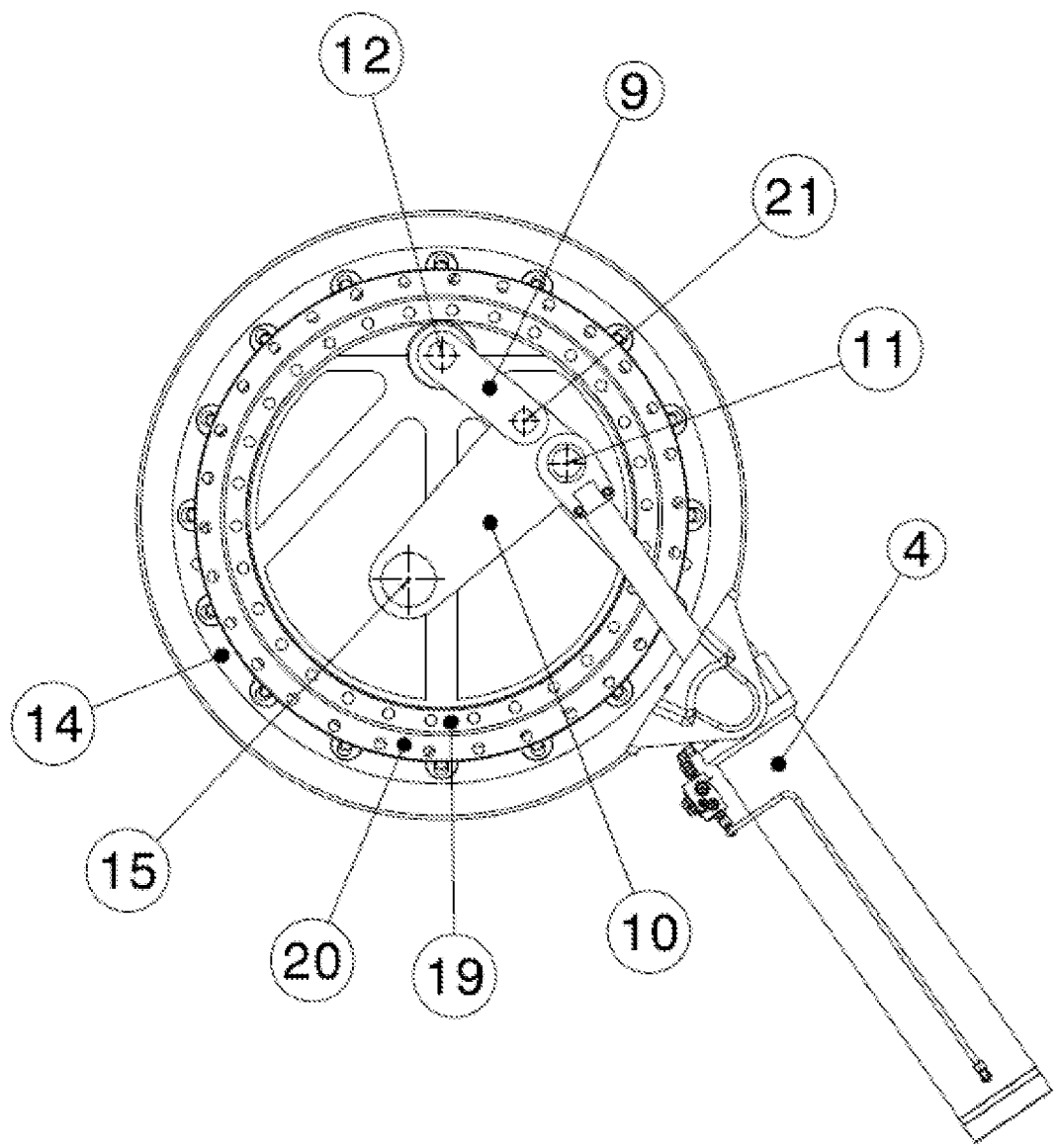
FIG. 11 is an alternative configuration of the azimuthal rotation means.

FIG. 5 and FIGS. 7 to 10 show a preferred embodiment of the invention, wherein the azimuthal linear actuator 4 is attached to the first articulated rod 9 and to the second articulated rod 10 of the first articulated assembly directly by means of the second vertical joint 11, which is also used to attach the first articulated rod 9 and the second articulated rod 10 to each other. FIG. 11 shows an alternative embodiment wherein the azimuthal linear actuator 4 can be attached to the first articulated rod 9 or to the second articulated rod 10 of the first articulated assembly by means of the vertical joint 11, while the two articulated rods 9, 10 are attached to each other by means of an additional fifth vertical joint 21 which is different from the second vertical joint 11, the third vertical joint 12 and fourth vertical joint 15.

Figure 6:
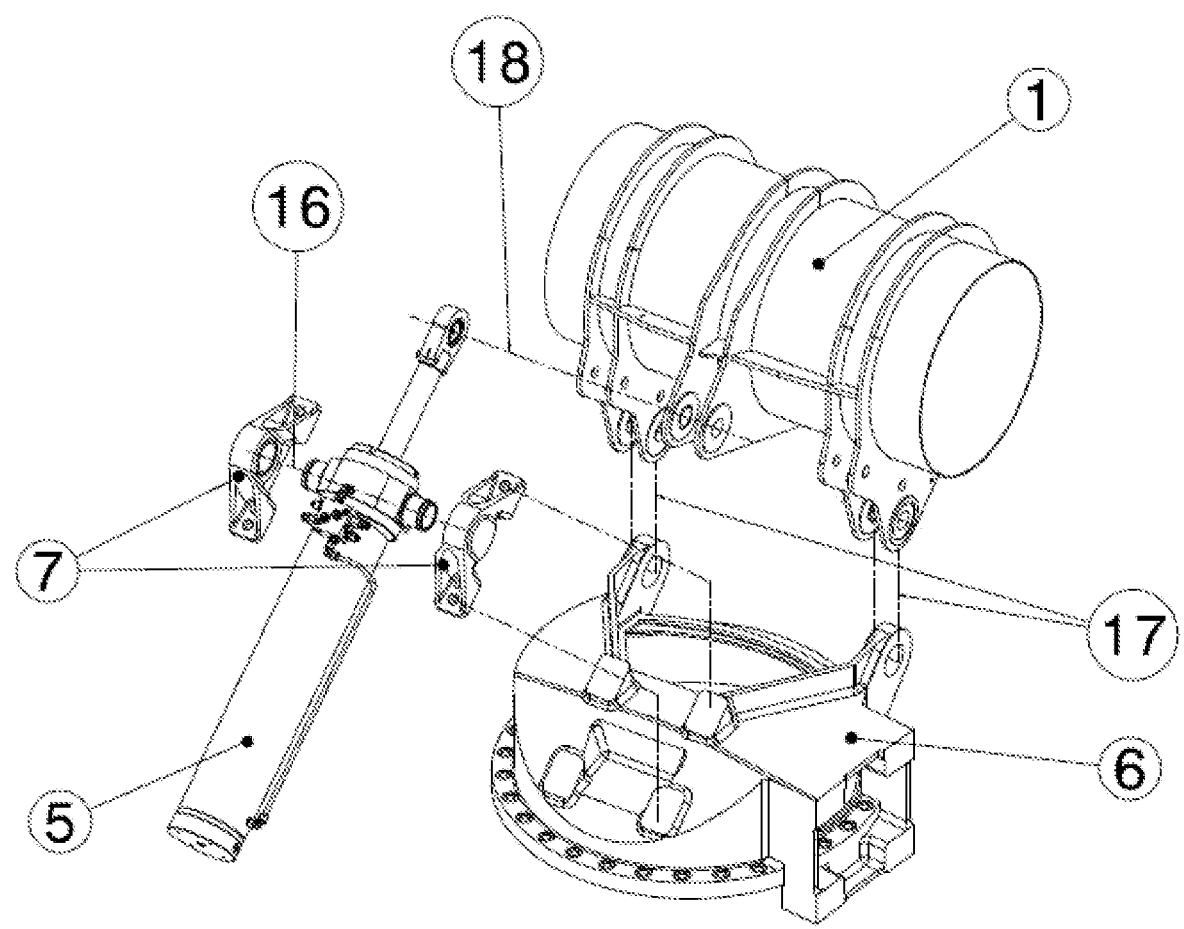
FIG. 6 is an exploded perspective view of the essential components of an embodiment of the elevation rotation means of the mechanism.
Figure 7:
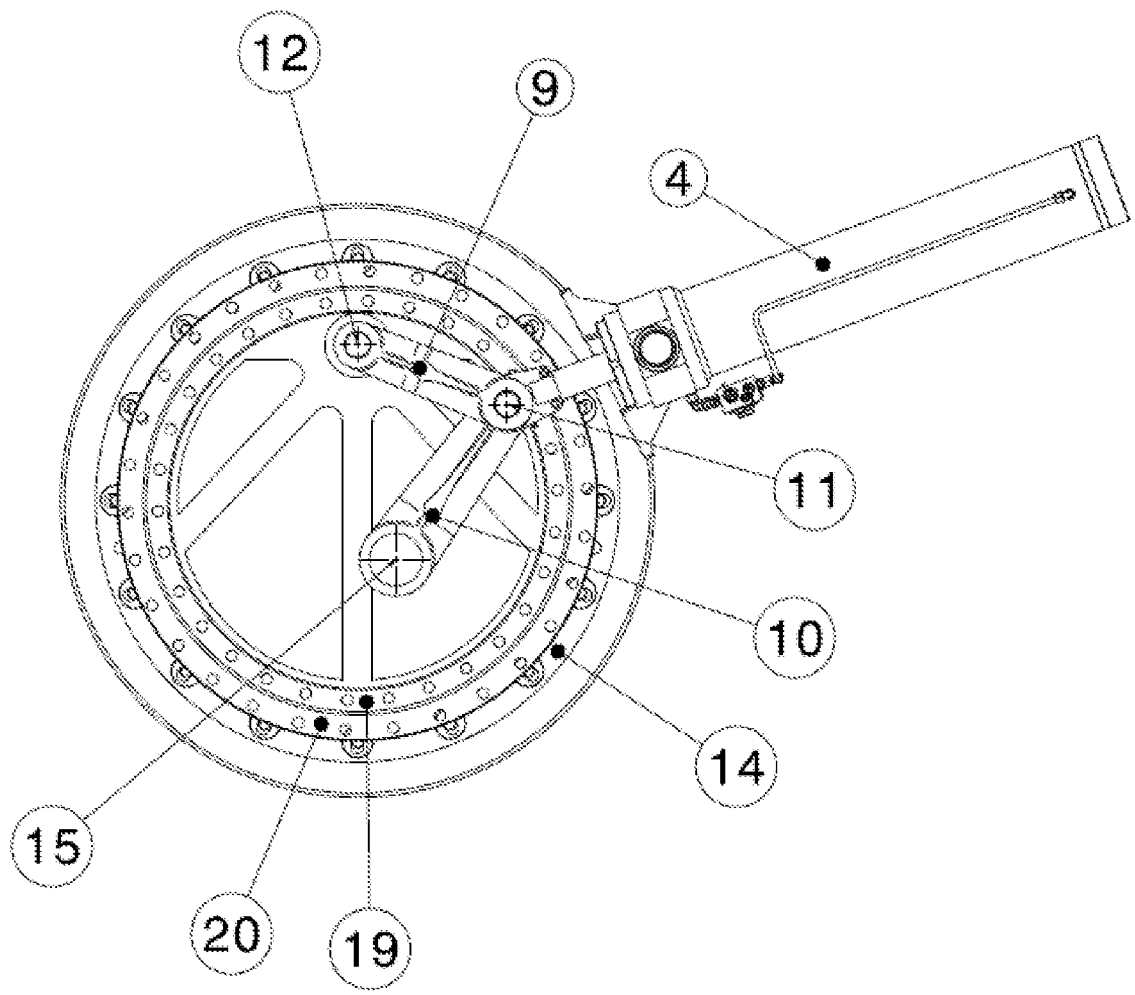
FIGS. 7 to 10 show a plant view of different successive positions of the azimuthal rotation means of FIG. 5.
Figure 8:
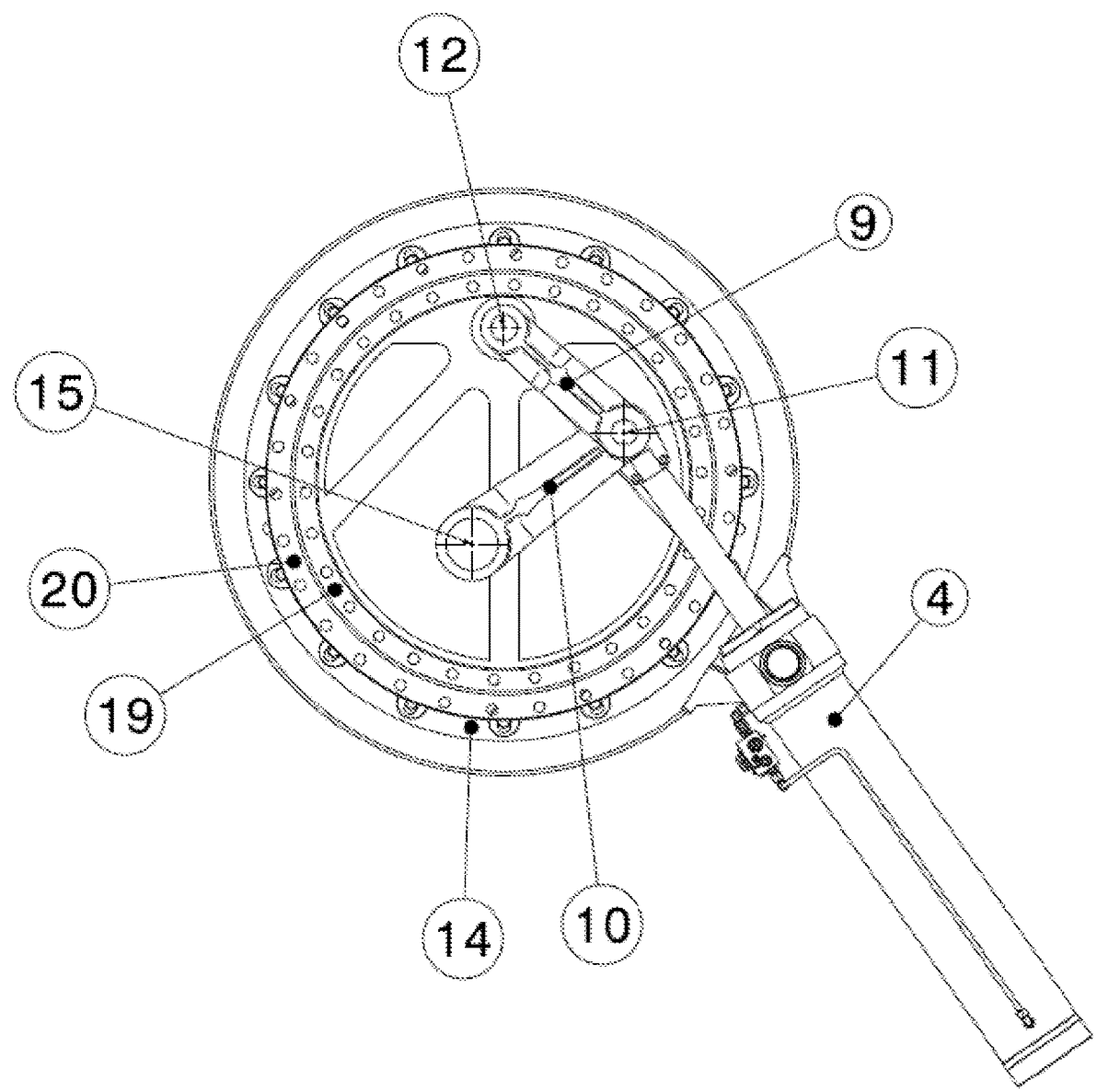
Figure 9:
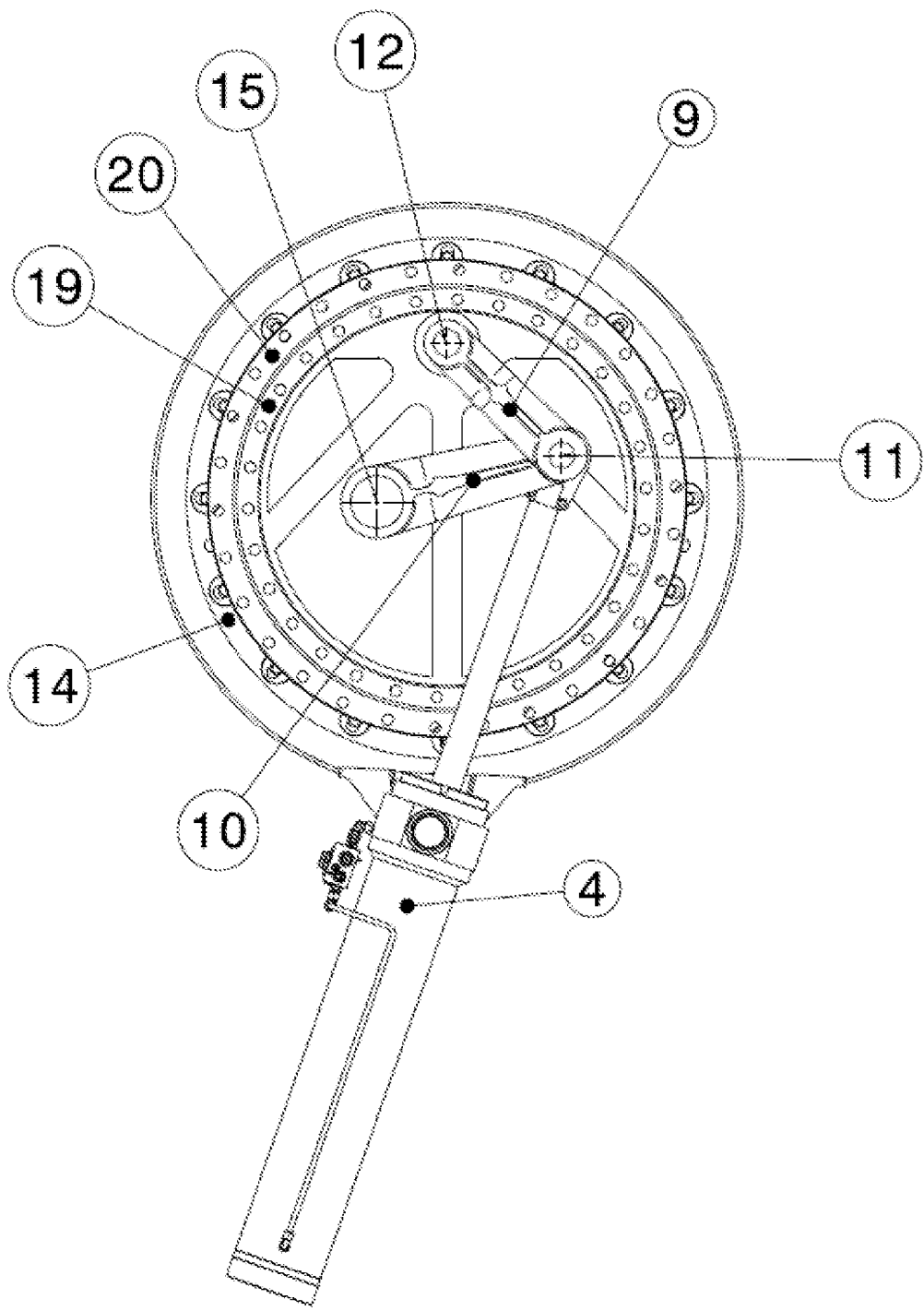
Figure 10:
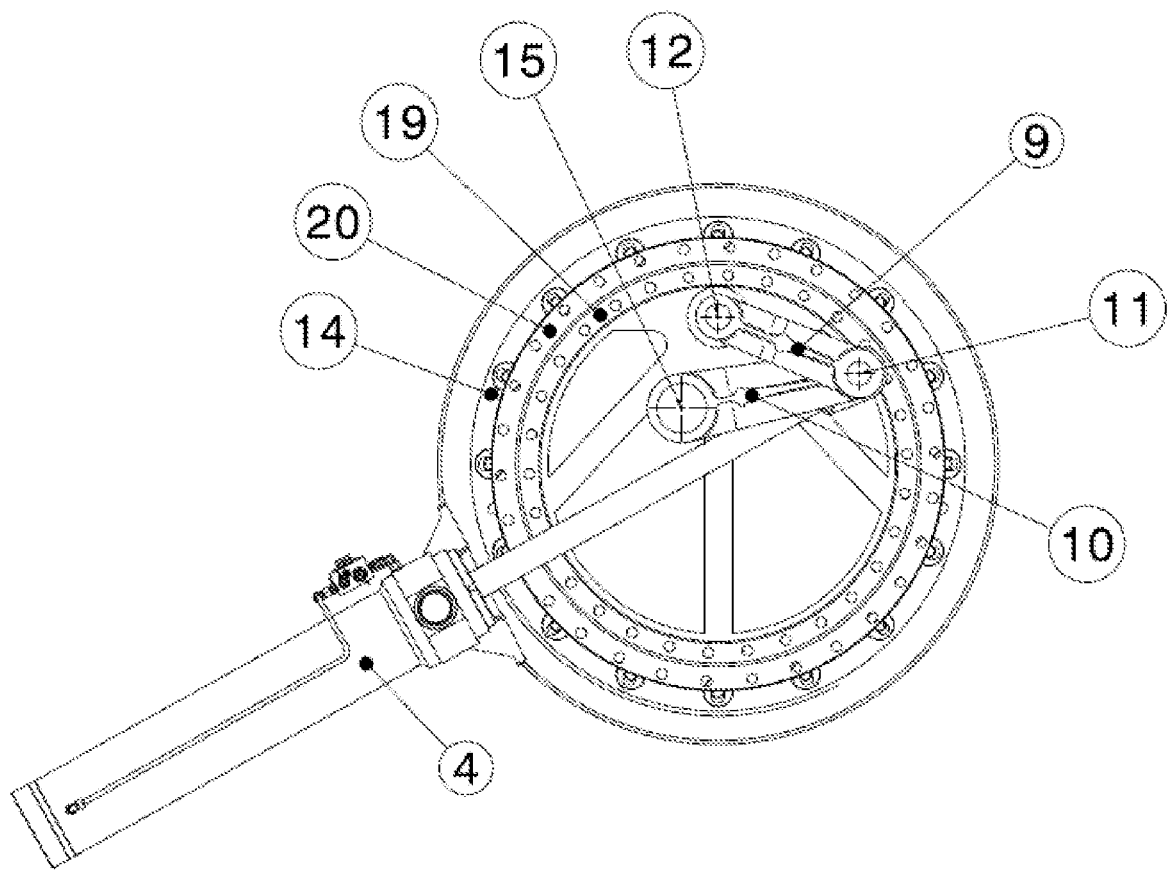

As to the elevation rotation means, they are responsible for performing the elevation rotation of the supporting structure 1 around the movable horizontal elevation shaft 17 arranged on the azimuthal rotating support 6, by means of an elevation linear actuator 5, which preferably is a hydraulic cylinder perpendicular to the movable horizontal shaft 17 which, according to the preferred embodiment of the invention, is articulated to the azimuthal rotating support 6 and to the supporting structure 1 by means of corresponding joints 16 and 18 parallel to the elevation shaft 17, and which does not intersect with the elevation shaft 17. Since the horizontal elevation shaft 17 is on the azimuthal rotating support 6, is movable and moves together with the azimuthal rotation, all the components and joints governing the elevation rotation rotate around the azimuthal vertical shaft. FIG. 6 shows this embodiment.

According to another particular embodiment of the invention, alternative to the one described above, this elevation linear actuator 5 is articulated by means of a first horizontal joint 16 to the azimuthal rotating support 6, and the piston of said elevation linear actuator 5 is attached by means of a second horizontal joint 18 around which a second articulated assembly can rotate. The first horizontal joint 16 and the second horizontal joint 18 are parallel to the movable horizontal elevation shaft.

This second articulated assembly in turn comprises a third articulated rod 24, which is attached to the supporting structure 1 by means of a third horizontal joint 25, and a fourth articulated rod 22, which is attached to the third articulated rod 24 by means of a horizontal joint, and to the azimuthal rotating support 6 by means of a fourth horizontal joint 26.

According to different embodiments of the invention, the elevation linear actuator 5, the third articulated rod 24 and the fourth articulated rod 22 can be arranged on the same plane, or alternatively, on different planes.

Figure 12:
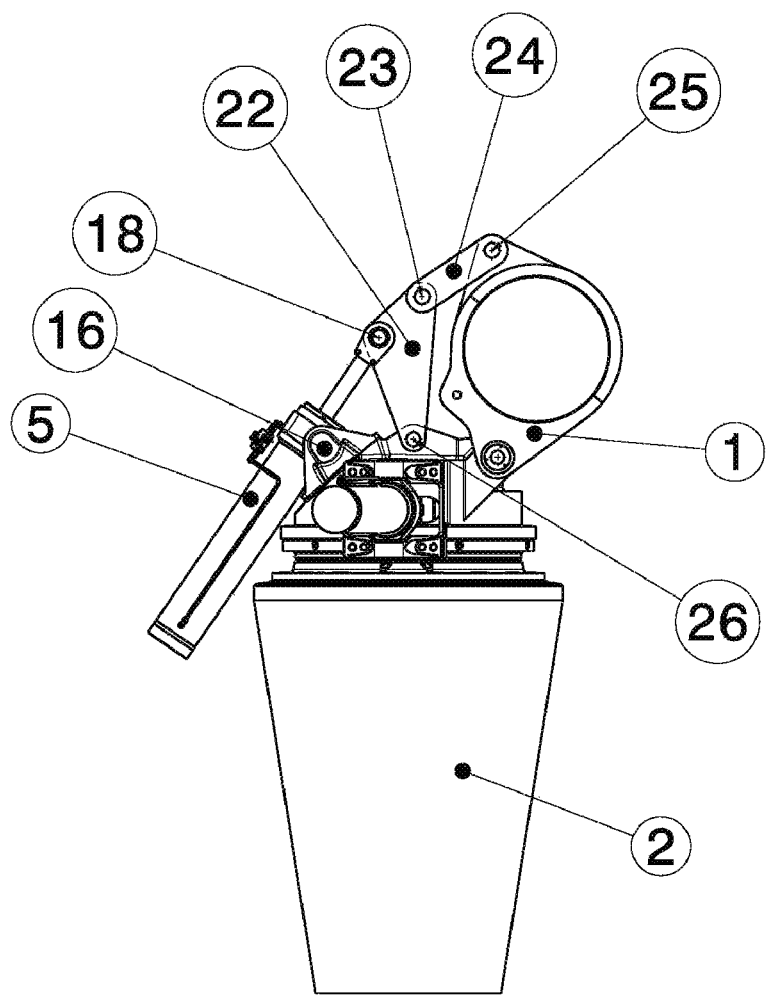
FIG. 12 is an alternative configuration of the elevation rotation means.

According to a variant of an embodiment of the invention, the elevation linear actuator 5 is attached to the third articulated rod 24 and to the fourth articulated rod 22 of the second articulated assembly directly by means of the horizontal joint 18, which is also used as the horizontal joint attaching the third articulated rod 24 and the fourth articulated rod 22. Alternatively, the elevation linear actuator 5 is attached to the third articulated rod 24 or to the fourth articulated rod 22 of the second articulated assembly by means of the second horizontal joint 18, while the third articulated rod 24 and the fourth articulated rod 22 are attached to each other by means of an additional fifth horizontal joint 23 different from the second horizontal joint 18, the third horizontal joint 25 and the fourth horizontal joint 26. FIG. 12 shows this embodiment.

Having clearly described the invention, it is noted that the particular embodiments described above are subject to detail changes provided they do not alter the fundamental principle and essence of the invention.

The invention claimed is:

1. An azimuthal and elevation rotation mechanism for a solar tracker comprising:
   a supporting structure of solar panels;
   a fixed vertical shaft arranged on a vertical pedestal;
   an azimuthal rotation means comprising a fixed part rigidly attached to the pedestal, and an azimuthal rotating support, the azimuthal rotating support configured to rotate around the fixed vertical shaft arranged on the vertical pedestal and attached to the fixed part by a rotating element,
   an elevation rotation means configured to elevate and rotate in a forward and backward direction around a movable horizontal elevation shaft, the movable horizontal elevation shaft arranged on the azimuthal rotating support by an elevation linear actuator perpendicular to the movable horizontal elevation shaft and articulated to the azimuthal rotating support and to the supporting structure;
   a single horizontal azimuthal linear actuator articulated by means of a first vertical joint to the azimuthal rotating support, wherein a piston is attached by means of a second vertical joint around which a first articulated assembly can rotate, the first articulated assembly comprising
      a first articulated rod, which is attached to the fixed part rigidly attached to the pedestal by means of a third fixed vertical joint, and
      a second articulated rod, which is attached to the first articulated rod by means of a second vertical joint and to the azimuthal rotating support by means of a fourth vertical joint,
   wherein the azimuthal and elevation rotation mechanism is configured to support the supporting structure of solar panels and provide azimuthal rotation and elevation rotation of the supporting structure.

2. The azimuthal and elevation rotation mechanism for a solar tracker according to claim 1, wherein the azimuthal linear actuator, the first articulated rod and the second articulated rod are arranged on the same plane.

3. The azimuthal and elevation rotation mechanism for a solar tracker according to claim 1, wherein the azimuthal linear actuator, the first articulated rod and the second articulated rod are arranged on different planes.

4. The azimuthal and elevation rotation mechanism for a solar tracker according to claim 1, wherein the azimuthal linear actuator is attached to the first articulated rod and to the second articulated rod of the first articulated assembly directly by means of the second vertical joint, which coincides with the joint attaching the first rod and the second rod to each other.

5. The azimuthal and elevation rotation mechanism for a solar tracker according to claim 1, wherein the azimuthal linear actuator is attached to the first articulated rod or to the second articulated rod of the first articulated assembly by means of the second vertical joint, and the two articulated rods are attached to each other by means of an additional fifth vertical joint different from the second vertical joint.

6. The azimuthal and elevation rotation mechanism for a solar tracker according to claim 1, wherein the rotating element is a slewing bearing comprising an inner ring and an outer ring.

7. The azimuthal and elevation rotation mechanism for a solar tracker according to claim 6, wherein the inner ring of the slewing bearing is affixed to the fixed part and the outer ring is affixed to the azimuthal rotating support.

8. The azimuthal and elevation rotation mechanism for a solar tracker according to claim 6, wherein the inner ring of the slewing bearing is affixed to the azimuthal rotating support and the outer ring is affixed to the fixed part.

9. The azimuthal and elevation rotation mechanism for a solar tracker according to claim 1, wherein the fixed part is integral to the vertical pedestal of the solar tracker.

10. The azimuthal and elevation rotation mechanism for a solar tracker according to claim 1, wherein the elevation linear actuator is articulated by means of a first horizontal joint to the azimuthal rotating support and in that the piston of said elevation linear actuator is attached by means of a second horizontal joint around which the supporting structure can rotate.

11. The azimuthal and elevation rotation mechanism for a solar tracker according to claim 1, wherein the elevation linear actuator is articulated by means of a first horizontal joint to the azimuthal rotating support and in that the piston of said elevation linear actuator is attached by means of a second horizontal joint around which a second articulated assembly can rotate, which in turn comprises
- a third articulated rod, which is attached to the supporting structure by means of a third horizontal joint,
- and a fourth articulated rod, which is attached to the third articulated rod by means of a horizontal joint and to the azimuthal rotating support by means of a fourth horizontal joint.

12. The azimuthal and elevation rotation mechanism for a solar tracker according to claim 11, wherein the elevation linear actuator, the third articulated rod and the fourth articulated rod are arranged on the same plane.

13. The azimuthal and elevation rotation mechanism for a solar tracker according to claim 11, wherein the elevation linear actuator, the third articulated rod and the fourth articulated rod are arranged on different planes.

14. The azimuthal and elevation rotation mechanism for a solar tracker according to claim 11, wherein the elevation linear actuator is attached to the third articulated rod and to the fourth articulated rod of the second articulated assembly directly by means of the same horizontal joint attaching the two rods.

15. The azimuthal and elevation rotation mechanism for a solar tracker according to claim 10, wherein the elevation linear actuator is attached to the third articulated rod or to the fourth articulated rod of the second articulated assembly by means of the horizontal joint, and the third and fourth articulated rods are attached to each other by means of an additional fifth horizontal joint different from the second horizontal joint, the third horizontal joint and the fourth horizontal joint.

* * * * *